United States Patent

[11] 3,550,708

| [72] | Inventor | Jean Michel Paramythioti<br>Paris, France |
|---|---|---|
| [21] | Appl. No. | 807,030 |
| [22] | Filed | Mar. 13, 1969 |
| [45] | Patented | Dec. 29, 1970 |
| [73] | Assignee | Albaret S. A.<br>Rantigny, France<br>a corporation of France |
| [32] | Priority | Apr. 8, 1968 |
| [33] | | France |
| [31] | | No. 147,286 |

[54] DIRECTION AND SPEED CONTROL SYSTEM FOR MOTOR VEHICLES
9 Claims, 5 Drawing Figs.

[52] U.S. Cl. .................................................. 180/6.48,
60/53, 180/6.3, 180/6.36, 180/66
[51] Int. Cl. ....................................................... B62d 11/04
[50] Field of Search........................................... 180/6.48,
6.5, 6.3, 6.36, 6.34

[56] References Cited
UNITED STATES PATENTS
| 2,906,356 | 9/1959 | Richard........................ | 180/6.48 |
| 3,161,245 | 12/1964 | Thoma......................... | 180/6.48 |

*Primary Examiner*—A. Harry Levy
*Attorney*—Young & Thompson

ABSTRACT: A motor vehicle has at least two driving members driven by a hydrostatic transmission under the control of two sliding control elements, movement of which is controlled by a rocking lever. The rocking lever is mounted on a slide member which can be axially moved, by means of a conventional steering wheel, together with the rocking lever to thereby change the proportional displacement of the sliding control elements and effect steering of the vehicle by providing variable speeds of each driving member. Preferably the vehicle also has a pivoted support wheel connected by an arm to the sliding member so that movement of the sliding member causes the support wheel to pivot.

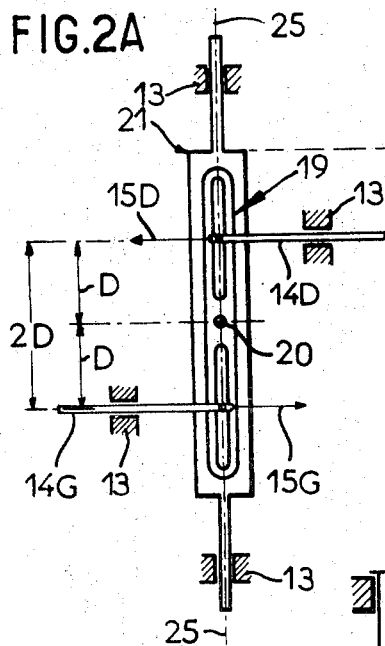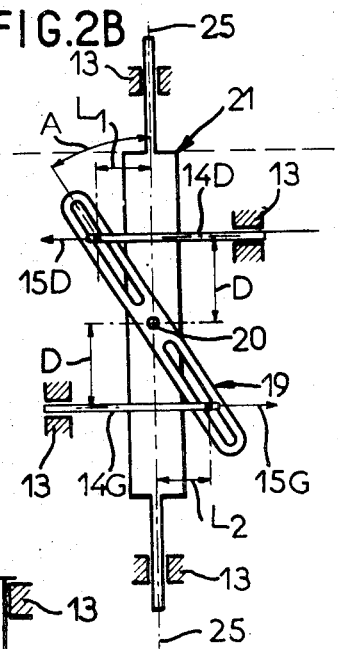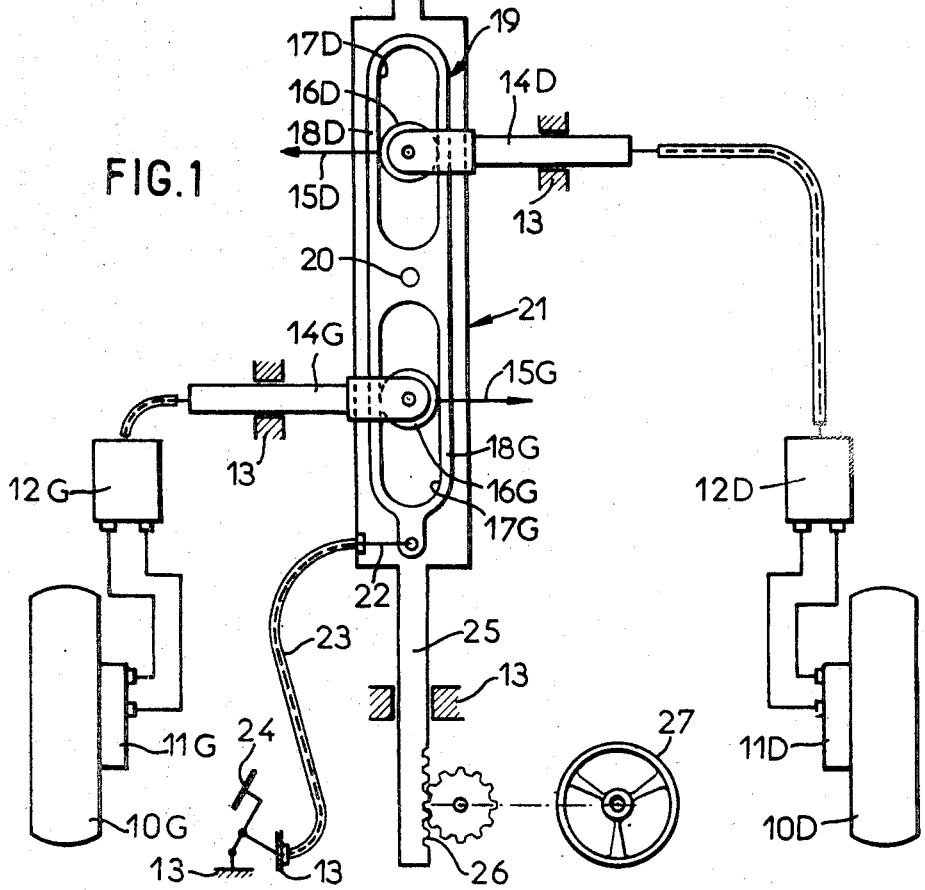

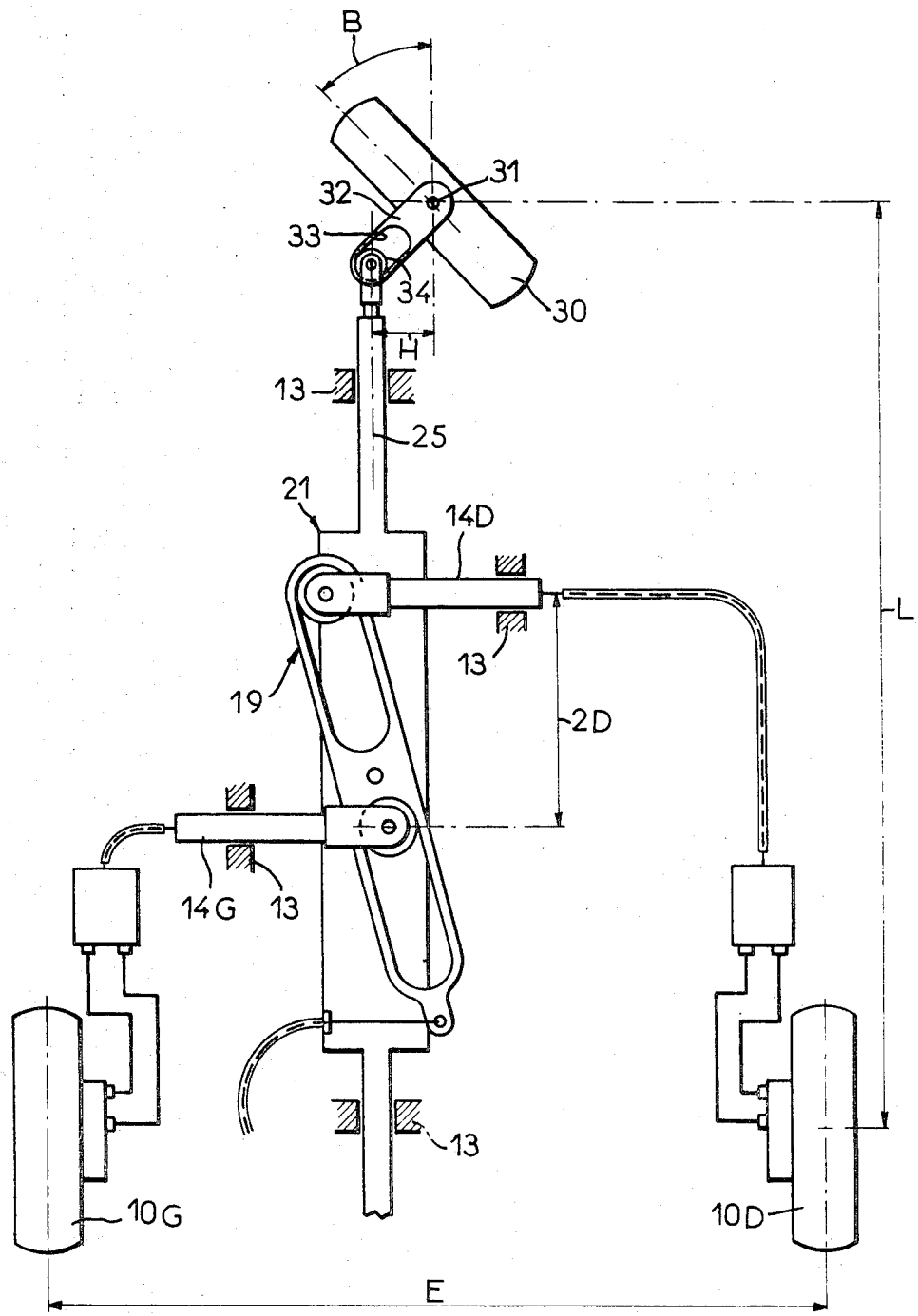

DIRECTION AND SPEED CONTROL SYSTEM FOR MOTOR VEHICLES

This invention relates to a direction and speed control system for motor vehicles.

Driving a vehicle, whatever its working principle, necessitates the application of two essential control arrangements, that is to say a speed control and a directional control which have to be capable of being applied independently of one another.

For ordinary vehicles which have at least two sets of wheels spaced out along their longitudinal axis, the directional control is effected by suitable steering of one or both sets of wheels.

This directional control offers the advantage of being very flexible and capable of easy application by means of a steering wheel the operation of which corresponds to the natural reflexes of any driver.

However, this directional control requires the presence of a minimum weight on the dirigible wheels, without which steering would have no effect. If the dirigible wheels are not driving wheels, this means that load is removed from the driving wheels to the extent, required for the dirigible wheels which is a serious drawback.

The directional control likewise necessitates the presence of differential elements in the set of driving wheels. As is well known, these differential elements frequently cause difficulties in connection with adhesion, and these difficulties are only partially and imperfectly overcome by the intervention of very complex devices, such as devices ensuring an automatic locking of the differential elements in the case of a loss of adhesion by any of the driving wheels.

With vehicles of the endless-track laying type which bear on the ground only through two independent drive members, that is to say a right-hand drive member and a left-hand drive member, the control of direction is effected by differentiating in a suitable manner the speed of these two drive members, that is to say by locking one of them.

This arrangement makes it possible to avoid the use of differential elements, but it can only be applied to vehicles with a very short wheelbase, as otherwise very considerable skidding may ensure, causing damage either to the ground or to the tires of the vehicle. Furthermore, such a directional control is lacking in flexibility, it being applied most frequently by means of various types of lever, the operation of which does not correspond to the natural reflexes.

Furthermore there is not, generally speaking, complete independence between the speed controls and the directional controls in a track-laying vehicle, since operation of the directional control involves a variation in speed and vice versa.

An object of this invention is to obviate these drawbacks in the case of a motor vehicle of the kind bearing on the ground through at least two independent drive members, that is to say a right-hand drive member and a left-hand drive member, such as wheels, roller trains, endless tracks and so on, each of the said drive members being capable, independently of the other, of being controlled at variable speed by the sliding of a sliding control element of a stepless or continuous speed varying device such as a variable-flow hydraulic pump.

For this purpose this invention proposes a device in which the said right- and left-hand control sliding control elements are mounted to be axially slidable in two opposed parallel directions and carry means of engagement with conjugate sliding means of engagement carried by the opposite arms of a rocking lever or compensation member dependent on the vehicle speed control, the said rocking lever being mounted to pivot on a slide member itself mounted so as to slide under the control of an ordinary steering wheel.

Control of the rocking lever alone causes an equal outward travel of the two sliding control elements and, starting from this, the forward movement in a straight line of the vehicle, at a speed determined by the angle of the rocking lever with the slide member.

The conjoint control of the slide member by the steering wheel causes additional variations in the position of these sliding control elements, and hence a curving-in of the path of the vehicle; but in spite of these additional variations, the sum of the outward travels of the two sliding control elements remains constant and is determined by the angle of the rocking lever with the slide member. The speed of the vehicle therefore remains unchanged.

Likewise, the turning circle radius imparted to the path of the vehicle is not affected by a concomitant alteration in the speed of the said vehicle, because the outward travels of the two sliding control elements remain in a constant ratio.

Thus from a first point of view, the invention relates more particularly to track-laying vehicles, and its advantageously ensures for them a control of direction by steering wheel, and a complete independence between the directional control and the speed control.

But, from a second essential point of view, the invention makes it possible to envisage the production of a vehicle in which all the advantages of the two types of control described above are obtained, without any drawbacks being involved.

Such a vehicle comprises at least one orientable support wheel and in accordance with the invention this latter is connected to an arm comprising means for engaging with complementary means of engagement carried by the slide member of the above device, the axis of sliding of this slide member being arranged to the side of the pivot axis of the said guiding wheel.

By making a suitable choice of the constructional parameters, operation of the slide member of the above device, when the vehicle is in movement, imparts to the support wheel a steering action exactly corresponding to the radius of the turning circle imposed at the same instant on the vehicle by its driving members in response to the same actuation of the said slide member.

There is therefore complete concordance of the two direction control arrangements.

A vehicle thus equipped may of course have a long wheelbase if so desired, and it is relieved from all the problems of differential elements, its right- and left-hand driving members having their speeds controlled independently, both in straight travel and while turning.

The essential interest of the matter however resides in the possibilty of producing a vehicle having a main set of driving wheels carrying almost all the load and one or more support wheels only very lightly loaded and incapable of ensuring by themselves the direction to be travelled but compelled to orientate themselves in perfect synchrony with the radius of the turning circle imposed by the driving wheels.

Specific embodiments of the invention will now be described by way of example with reference to the accompanying diagrammatic drawings, in which:

FIG. 1 which illustrates the application of the invention to a track-laying vehicle, is an assembly view of a device embodying the invention and of the two driving members of the said vehicle.

FIGS. 2A, 2B and 2C are plan views of the device, represented in isolation, and illustrate the manner of intervention at different stages of the said intervention and, FIG. 3 is a view to similar FIG. 1 and relates to the application of the invention to a vehicle having two driving wheels and an orientable support wheel.

In accordance with the embodiment represented in the invention is applied to a vehicle of the track-laying type, that is to say a vehicle which bears on the ground only through two independent driving members, symmetrical with one another in relation to the longitudinal axis of the vehicle. In the FIGS. these driving members have been represented diagrammatically by single wheels, 10D for the right-hand driving member and 10G for the left-hand driving member, but it must be understood that they could each consist of a set of wheels, or an endless tracks, or any other suitable rolling member.

As shown by way of example, the vehicle has a hydrostatic transmission; each of the wheels 10D, 10G of this vehicle is controlled by a constant-rate motor or driving unit, respectively 11D, 11G, itself controlled by a variable-flow pump, 12D, 12G, respectively.

The pumps 12D, 12G, are driven by any suitable motor or driving means (not shown in detail) and their rates of flow and consequently the speeds of rotation of the corresponding wheels 10D, 10G are respectively proportional to the outward travel, in relation to a fixed mark, for instance the frame 13 of the vehicle, of sliding control elements 14D, 14G respectively.

The sliding control elements 14D, 14G are mounted so as to slide opposed parallel directions 15D, 15G, the said directions being, in practice, but not necessarily, perpendicular to the longitudinal axis of the vehicle. Each of these sliding control elements 14D, 14G carries a roller 16D, 16G, respectively. These rollers 16D, 16G are engaged in slots 17D, 17G, respectively provided in the opposed arms 18D, 18G of a rocking lever 19 arranged on a pivot 20 on a slide member 21.

The rocking lever 19 is subjected to the speed control of the vehicle. For instance, as represented diagrammatically, it is harnessed by a cable 22, placed in a sheath 23, to an acceleration pedal 24 at the driver's disposal.

The slide member 21 is mounted on the frame of the vehicle to be slidable along an axis 25 which is perpendicular to the directions of sliding 15D, 15G of the sliding control elements 14D, 14G. In accordance with the form of embodiment represented, it is extended by a rack 26 controlled by a conventional steering wheel 27.

The functioning of the device will be better understood by referring now to FIGS. 2A, 2B and 2C.

In FIG. 2A which partly repeats FIG. 1, the vehicle is supposed to be at a standstill. The pivot 20 of the rocking lever 19 is at an equal distance D from the directions of sliding 15D, 15G of the sliding control elements 15 14D, 14G, and the outward "travel" of these latter, in respect of the axis of sliding 25 of the slide member 21, is zero.

Let it be supposed first of all that by acting on the pedal 24 the driver of the vehicle has caused the rocking lever 19 to pivot through an angle A in relation to the slide member 21, (FIG. 2B). The sliding control elements 14D, 14G "travel out" in respect of the axis of sliding 25 of the slide member 21 and consequently the vehicle begins to move forward at a speed which is a function of the angle A. As the outward travels $L_1$, $L_2$ of these sliding control elements are equal to one another, the speeds of rotation of the wheels 10D, 10G which they control are also equal, and, consequently, the vehicle moves in a straight line.

Let it now be supposed that by acting on the steering wheel 27 the driver of the vehicle causes the slide member 21 to slide a distance X, in the direction corresponding for instance to an approach of the pivot 20 towards the sliding control element 14G. As the position of the rocking lever 19 in relation to the slide member 21 remains unchanged, the said rocking lever compels the sliding control element 14D to "travel out" a little more and, reciprocally, compels the sliding control element 14G to "return" by a quantity equal to the supplementary outward travel of the sliding control element 14D. The outward travel of the sliding control element 14D becomes $L'_1$ which is greater than $L_1$, and that of the sliding control element 14G becomes $L'_2$ which is less than $L_2$.

The outward travels $L'_1$ and $L'_2$ no longer being equal, the vehicle begins to turn, on a radius determined by the ratio $L'_1/L'_2$. Since $L'_1$ in the example represented is greater than $L'_2$ the vehicle will turn to the left.

But, as the angle A of the rocking lever 19 with the slide member 21 remains unchanged, the sum $(L'_1 + L'_2)$ of the new outward travels of the sliding control elements 14D, 14G is equal to the sum $(L_1 + L_2)$ of the preceding outward travels.

Consequently the speed of the vehicle remains unchanged.

A change in the angle A of the rocking lever 19 in respect of the slide member 21 causes a change in the outward travels of the sliding control elements 14D, 14G, but as these outward travels remain in an equal ratio, whatever the angle A, the turning angle of the vehicle is not changed, yet its speed follows the development imposed on the Angle A.

Thus the speed control and the directional of the vehicle are completely independent of one another.

FIG. 3 illustrates the application of the invention to a vehicle having, in addition to two independent driving members 10D, 10G, one or more orientable support wheels 30. In the drawing only one wheel 30 is shown, which wheel is pivotable about an axis 31.

The axis of sliding 25 of the slide member 21 is at a distance H from the pivot axis 31.

Furthermore the support wheel 30 is integral with an arm 32 pierced by a slot 33 in which is engaged a roller 34 carried by the slide member 21.

Thus the sliding control of this slide member simultaneously ensures a differential control of the driving wheels 10D, 10G as before and hence a turning of the vehicle, and, also a deflection through an angle B of the support wheel 30.

A simple mathematical calculation shows that, if:

E designates the distance apart of the driving wheels 10D, 10G.

L designates the longitudinal wheelbase of the vehicle, 2D designates the distance of the sliding axes from the sliding control elements 14D, 14G, and H designates the distance between the sliding axis 25 of the slide member and the axis of pivoting 31 of the support wheel 30. It is sufficient to have the following relationship between these various constructional parameters:

$$H = E.D/2L$$

in order that, at any instant, the angle of deflection B of the support wheel 30 shall correspond exactly to the turning radius resulting from the differential control simultaneously imposed on the driving wheels 10D, 10G.

Of course the invention is not restricted to the embodiments described and represented, but covers all modifications. In particular the rollers and slots used could be replaced by any other suitable complementary means of engagement. Furthermore, in the case where the vehicle has one support wheel the slide member of the device may be mounted to be slidable either under the control of the steering wheel or directly under the control of the said support wheel. Moreover the invention applies not only to vehicles with hydrostatic transmission, such as are more particularly mentioned above, but to all vehicles in which the speed imposed on a driving rolling member is connected with the position of a sliding control element in accordance with a continuous function which, preferably, is a function of proportionality.

I claim:

1. In a motor vehicle of the type comprising at least two independent driving members, by means of which the vehicle bears on the ground, apparatus for the speed and directional control of said vehicle comprising:
   a. at least two sliding control elements mounted to slide axially in two parallel opposed directions;
   b. means linking each sliding control element with a respective one of said driving members whereby axial sliding of the control elements provides independently controllable variable speed of said driving members;
   c. first engagement means carried by each of said sliding control elements;
   d. a two-armed rocking lever subjected to the speed control of the vehicle;
   e. sliding second engagement means carried by each arm of said rocking lever, each said second engagement means being engaged with a respective one of said first engagement means; and
   f. a slide member mounted to slide under the control of a conventional steering wheel, said slide member pivotably carrying said rocking lever.

2. Apparatus as claimed in claim 1, wherein the function which connects the displacement of one sliding control element with the speed of the associated driving member is a function of proportionality.

3. Apparatus as claimed in claim 1, wherein the slide member is mounted to slide in a direction perpendicular to the directions of sliding of the sliding control elements.

4. Apparatus as claimed in claim 1, wherein the said sliding second engagement means comprise a slot in each arm of the rocking lever, and wherein the first engagement means comprise fingers, projections, rollers or the like carried by said sliding control elements.

5. In a vehicle of the type comprising at least two independent driving members and at least one support wheel by means of which the vehicle bears on the ground, apparatus for the speed and directional control of said vehicle comprising:
   a. at least two sliding control elements mounted to slide axially in two parallel opposed directions;
   b. means linking each sliding control element with a respective one of said driving members whereby axial sliding of the control elements provides independently controllable variable speed of said driving members;
   c. first engagement means carried by each of said sliding control elements;
   d. a two-armed rocking lever subjected to the speed control of the vehicle;
   e. sliding second engagement means carried by each arm of said rocking lever, each said second engagement means being engaged with a respective one of said first engagement means;
   f. a slide member mounted to slide under the control of a conventional steering wheel, said slide member pivotably carrying said rocking lever;
   g. an arm connected to said support wheel;
   h. third engagement means carried by said arm;
   i. fourth engagement means carried by said slide member;
   and
   j. pivot means for said support means, said pivot means being arranged at a distance from the axis t of said slide member.

6. Apparatus as claimed in claim 5, wherein the function which connects the displacement of one sliding control element with the speed of the associated driving member is a function of proportionality.

7. Apparatus as claimed in claim 5, wherein the slide member is mounted to slide in a direction perpendicular to the directions of sliding of the sliding control element.

8. Apparatus as claimed in claim 5, wherein the said sliding second engagement means comprise a slot in each arm of the rocking lever, and wherein the first engagement means comprise fingers, projections, rollers or the like carried by said sliding control elements.

9. Apparatus as claimed in claim 5, characterized in that if E designates the distance apart of the driving members, L designates the longitudinal wheel base of the vehicles, 2D designates the distance apart of the sliding axes of the the sliding control elements, and H designates the distance between the axis of sliding of the slide member and the pivot axis of the support wheel, then these parameters are connected by the relationship:

$$H = E.D/2L$$